United States Patent [19]

Irvin

[11] 4,303,999
[45] Dec. 1, 1981

[54] PHONOGRAPH HAVING AN IMPROVED TONE ARM ASSEMBLY

[75] Inventor: Ronald D. Irvin, Poway, Calif.

[73] Assignee: The Quaker Oats Company, Chicago, Ill.

[21] Appl. No.: 113,748

[22] Filed: Jan. 18, 1980

[51] Int. Cl.³ .......................... G11B 3/14; G11B 3/20; G11B 17/06
[52] U.S. Cl. ...................................... 369/75; 369/225; 369/244; 369/253; 369/78
[58] Field of Search .......................... 274/2, 14, 23 R; 369/75, 78, 225, 244, 253

[56] References Cited

U.S. PATENT DOCUMENTS

| | | | |
|---|---|---|---|
| 2,060,117 | 11/1936 | Proctor | 274/23 R |
| 2,973,207 | 2/1961 | Van Antwerp | 274/2 |
| 3,044,783 | 7/1962 | Doncaster | 274/23 R |
| 3,281,154 | 10/1966 | Schmetter | 274/23 R |
| 3,328,036 | 6/1967 | Reed et al. | 74/23 R |
| 3,408,080 | 10/1968 | Dimitracopoulos | 274/23 R |
| 3,529,834 | 9/1970 | Renoux | 274/23 R |

FOREIGN PATENT DOCUMENTS 918081 2/1963 United Kingdom ............ 274/23 R

*Primary Examiner*—John W. Shepperd
*Attorney, Agent, or Firm*—Cumpston & Shaw

[57] ABSTRACT

The object of this invention is to provide an improved phonograph having an improved tone arm assembly and structure associated therewith for automatically returning the tone arm to its rest position when the phonograph cover is closed.

The improved tone arm is mounted in a slightly unbalanced condition for movement under the influence of gravity to a normal position. In this normal position the up and down motion of the needle on the record and the force exerted thereagainst is independent of the tone arm.

10 Claims, 5 Drawing Figures

PHONOGRAPH HAVING AN IMPROVED TONE ARM ASSEMBLY

BACKGROUND OF THE INVENTION

1. Field of the Invention

This invention relates to phonographs, and particularly to an improved phonograph having an improved tone arm and structure associated therewith for automatically returning the tone arm to its rest position.

It is desirable to produce phonographs that are of simple design, rugged, durable, reliable, safe and yet capable of simulating adult phonographs with regard to operation, sound reproduction and other qualities. Such phonographs provide an attractive and appealing toy for children.

2. Description of the Prior Art

Phonographs are known having a tone arm assembly comprising a rigid lever pivoted on a pivot between the ends thereof, and having a needle-cartridge secured to one end for engaging a record on a turntable. A balance mechanism is secured to the other end of the lever for adjusting the pressure exerted by the needle on the record. Such tone arm assemblies are formed from highly precise parts and are extremely delicate in design, manufacture and operation. A problem with such tone arm assemblies is that they are ill suited for phonographs which are subjected to rough handling by children. Downward and upward (lifting) pressure exerted by a youngster on the needle-cartridge end of the lever, and sliding of the arm and needle across the record generally results in extensive and often irreparable damage to the record and/or tone arm.

SUMMARY OF THE INVENTION

In accordance with the present invention, an improved phonograph is provided having an improved tone arm assembly. The tone arm assembly comprises a support arm mounted for pivotal movement in a horizontal plane substantially parallel to and spaced above the phonograph turntable. A tone arm housing is pivotally mounted on the support arm for pivotal movement in unison therewith between rest and playing positions. The tone arm housing is further slightly unbalanced such that one end thereof is pivotally moved relative thereto by gravity to a normal position toward but spaced from the turntable. A needle-cartridge carrying arm is mounted on the tone arm housing for pivotal movement relative thereto with the needle engaging a record on the turntable when the tone arm housing is in its normal and playing positions. Spring means coupled to the needle-cartridge carrying arm provides the only force in addition to the weight of the needle-cartridge carrying arm for urging the needle into engagement with the record.

In a more specific aspect of the invention, the tone arm housing is pivotal between stop means on the support arm. One of the stop means comprises a spring for returning the tone arm housing to its normal position in the event one end of the housing is depressed toward the turntable. The other stop means resists and limits upward movement of the tone arm housing in the event it is lifted by a child, thereby limiting access to the more sensitive parts of the tone arm assembly.

In another aspect of the invention, the phonograph has a cover movable to and from a closed position. The cover has cam means for engaging a cam follower on the tone arm housing when the tone arm is in a playing position and the cover is closed. Interaction between the cam and cam follower initially pivots the tone arm away from its normal position withdrawing the needle from the record, and then while the needle is withdrawn pivots the tone arm to its rest position removed from the record.

In still another aspect of the invention, the needle-cartridge carrying arm has one end pivotally mounted on the tone arm housing, and the needle-cartridge mounted on its other end. A spring connecting the tone arm housing to the needle-cartridge carrying arm urges the needle into engagement with a record with a force of substantially 6 grams.

The primary advantage of the invention as summarized is that it solves the aforementioned problem of tone arm assemblies, namely, that they are too delicate to withstand the rough handling and abuse to which they are subjected by children. Another advantage of the invention is that it provides means for automatically withdrawing a needle from the record and returning the tone arm to its rest position when the phonograph cover is closed. Another advantage of the invention is that resilient stop means are provided on the ends of the support arm for limiting pivotal movement of the tone arm housing mounted thereon in clockwise and counter-clockwise directions. Still another advantage of this invention is that the needle force against the record is independent of the tone arm. The needle force is further limited to a small value sufficient to provide proper sound reproduction, but insufficient to cause irreparable record damage if the needle is inadvertently slid across the record.

The invention and its advantages will become more apparent from the detailed description of the invention presented below.

BRIEF DESCRIPTION OF THE DRAWINGS

The details of this invention will be described in connection with the accompanying drawings, in which.

DETAILED DESCRIPTION OF THE INVENTION

Figure 1:
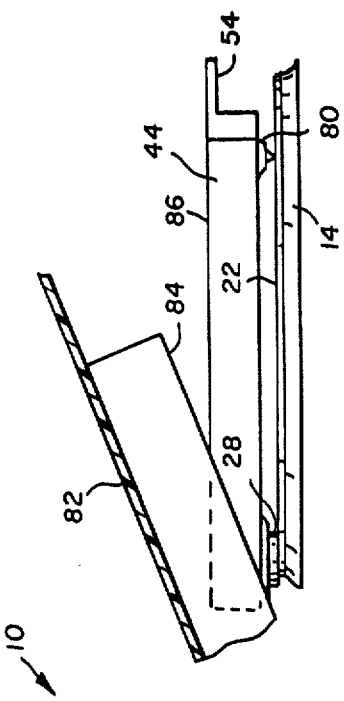
FIG. 1 is a top plan view of a preferred embodiment of a phonograph of this invention in which the cover is removed and portions broken away for purposes of clarity.

Referring to FIG. 1, a phonograph 10 constructed in accordance with a preferred embodiment of the invention comprises a platform 12 for rotatably supporting a turntable 14. The platform 12 further supports a drive means, not shown, for the turntable and on-off speed control means, of which only a control knob 16 and cooperating slotted scale 18 are shown. The turntable 14 is of a conventional type provided with an adapter 20 for accommodating 33⅓ rpm and 45 rpm records 22. The platform 12 further supports a tone arm 24 which is shown in a playing position in full lines and in its rest position in broken lines.

Figure 2:
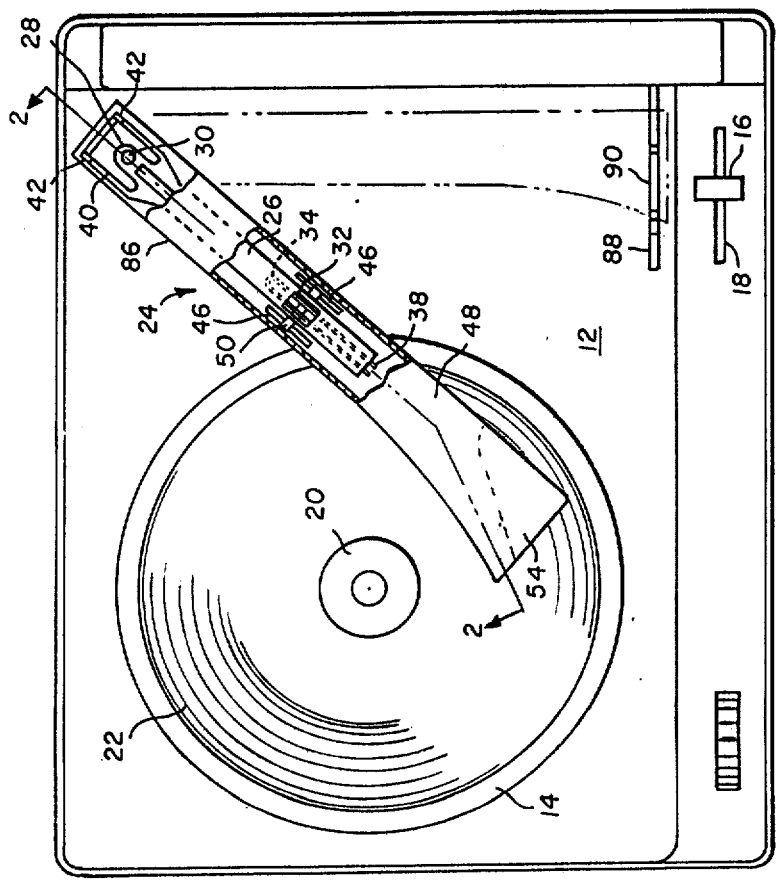
FIG. 2 is an enlarged section view taken substantially along line 2—2 of FIG. 1.

With reference to FIG. 2, the tone arm 24 comprises a rigid support lever 26 having a vertically extending bearing 28 at one end pivotally mounted on a fixed platform spindle 30. The support lever 26 is substantially parallel to and spaced above turntable 14. The lever 26 further has resilient stop means at each end thereof. One of the stop means comprises a long U-shaped spring 32 having its closed end 34 nesting within a groove 36 in the lever, and its open end 38 cantilevered from the free end of lever 26. The stop means at the bearing end 28 of the lever comprises a U-shaped member 40 integral therewith and extending laterally therefrom. The U-shaped member 40 has corner posts 42 extending upwardly. The purposes of the stop means will be explained in greater detail hereinafter.

An elongated tone arm housing comprising an upper member 44 of substantially inverted U-shaped cross section is pivotally mounted on support lever 26. The mounting is achieved as best seen in FIG. 1 by opposed notches in spaced plates 46 depending from the upper wall 48 of the housing for receiving laterally extending pivot pins 50 on the support arm. The housing further has a lower plate member 52 secured to upper member 44 for holding the notches and pins 50 in engagement. The notches and pins are arranged such that the housing 44 is slightly unbalanced causing the end portion 54 thereof furthest removed from spindle 30 to pivot downwardly until a depending plate 56 from upper wall 48 of the housing engages the open end 38 of spring 32. The spring holds housing end portion 54 out of engagement with turntable 14, and returns end portion 54 to its disengaged position if it is inadvertently depressed against the bias of spring 32 and then released. Upper wall 48 of housing member 44 further has an undersurface 58 for engaging posts 42 of resilient U-shaped member 40 if the housing end portion 54 is inadvertently lifted. The undersurface 58, U-shaped member 40 and the upper end of spindle 30 coact to resist and limit the upward pivotal movement of the tone arm 24 to a small angle and assist in limiting access by children to the more sensitive parts of the tone arm. It also enables the phonograph 10 to be picked up by tone arm 24 without damage to the tone arm or other phonograph parts.

Figure 3:
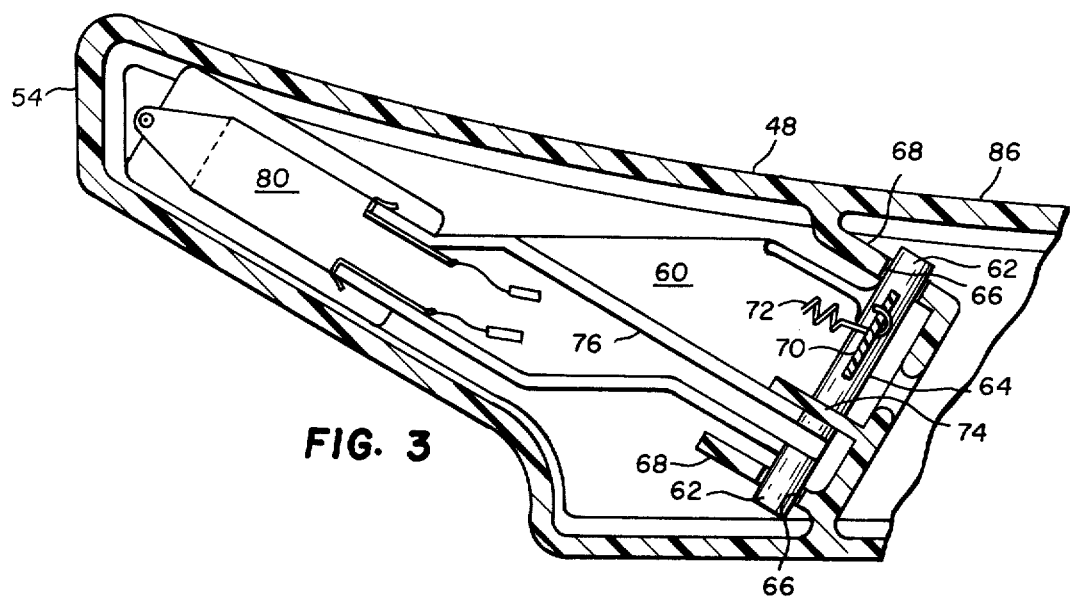
FIG. 3 is an enlarged segmental view taken substantially from line 3—3 of FIG. 2.

With reference to FIGS. 2 and 3, a needle-cartridge carrying arm 60 is shown having one end thereof pivotally mounted on the undersurface 58 of housing wall 48. The pivotal mounting is achieved by laterally extending ends 62 of a fixed rod 64 at the end of the lever nesting within U-shaped notches 66 in spaced plates 68 depending from upper wall 48. The arm rod 64 further has a radially extending flange 70 onto which one end of a helical spring 72 is secured. Lateral movement of arm rod 64 in notches 66 is prevented by plate 74 depending from wall 48 into a slot between one end of flange 70 and a rib 76 on arm 60. The opposite end of spring 72 is secured to a finger 78 depending from housing wall 48, and is under tension for urging the opposite end of arm 60 toward turntable 14. The opposite end of arm 60 further has a needle-cartridge 80 mounted thereon by any suitable means. With this structural arrangement, the force with which needle 80 is pressed against a record 22 on a turntable 14 is independent of tone arm housing 44 which rests on spring stop 32. Such force is dependent only upon the tension of spring 72 and the low mass of the needle-cartridge 80 and carrying arm 60 resulting in a needle force of only substantially 6 grams.

Such force is sufficient to produce excellent record sound reproduction, and yet insufficient to irreparably damage the record in the event the arm and needle are inadvertently slid across the record.

Figure 5:
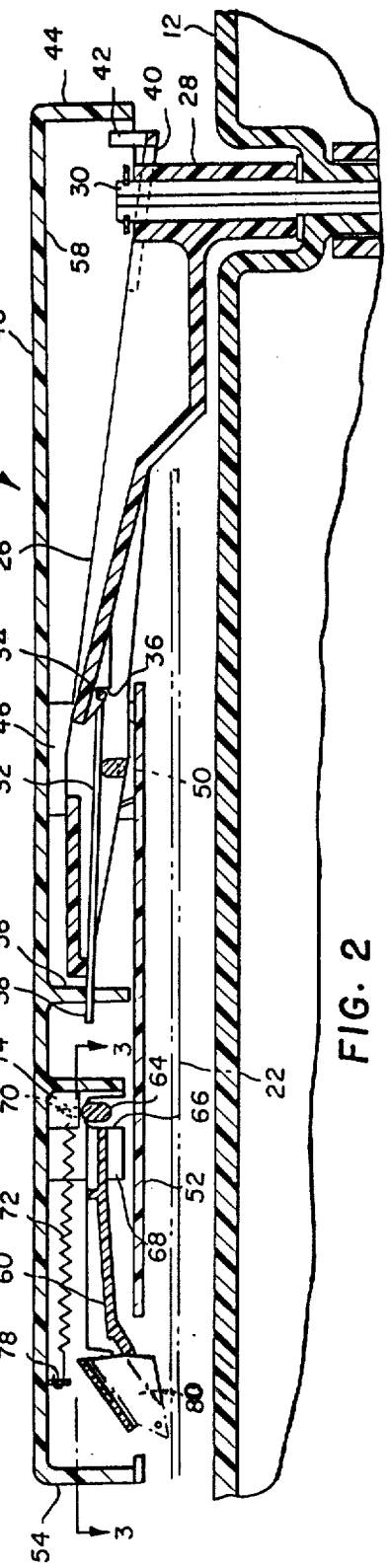
FIG. 5 (sheet one) is a segmental elevational view taken substantially from line 5—5 of FIG. 4.
Figure 4:
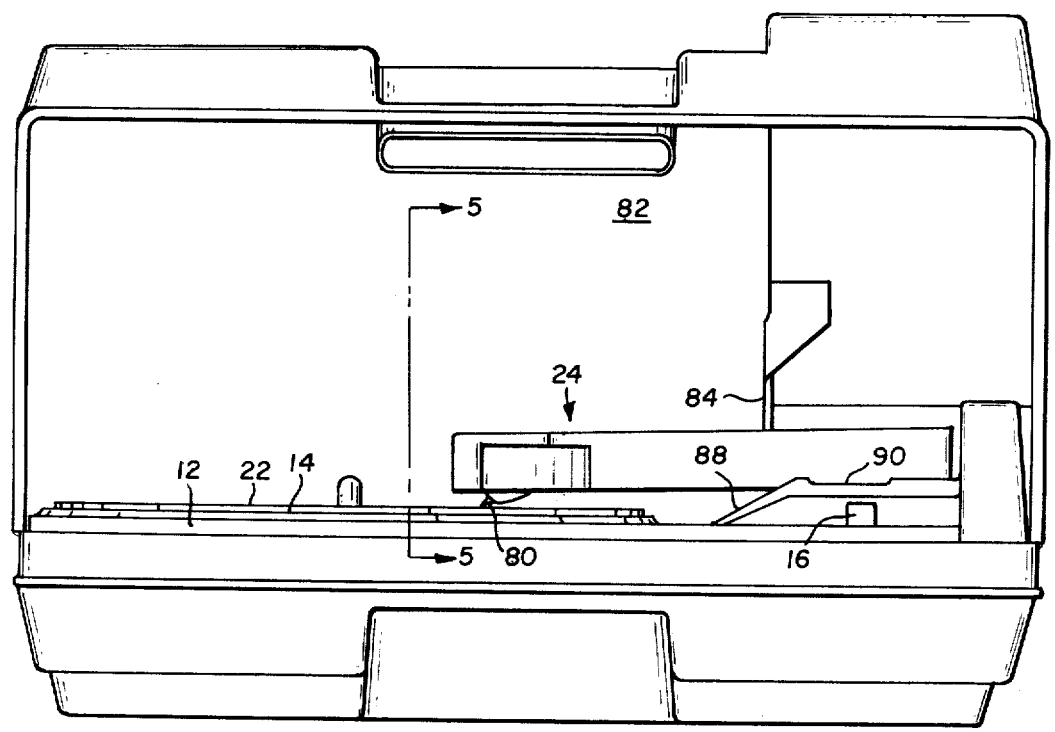
FIG. 4 is a front elevational view of the phonograph showing the cover partially closed and the cam flange thereon about to engage the cam follower edge on the tone arm.

With reference to FIGS. 1, 4 and 5, means are provided on phonograph 10 that coact with tone arm 24 for automatically returning the arm from a playing position on the record 22 (seen in full lines in FIG. 1) to its rest position (seen in broken lines in FIG. 1) when a phonograph cover 82 is closed. The arm returning means comprises a plate-like flange 84 depending from the undersurface of cover 82 as best seen in FIG. 5. The free edge of flange 84 forms a cam surface for engaging a cam follower formed by side edge 86 of upper wall 48 of tone arm housing 44. When cover 82 is closed, cam surface 84 initially engages cam follower edge 86 and pivots tone arm housing 44 until undersurface 58 engages posts 42 of U-shaped member 40 of support arm 26. This pivotal movement is in a direction withdrawing needle 80 from record 22. Continued closing of cover 82 causes cam surface 84 to cam tone arm 24 across record 22 while needle 80 is withdrawn, and then over an inclined ramp 88 onto a cradle 90 defining its rest position as best seen in FIGS. 1 and 4.

The invention has been described in detail with particular reference to preferred embodiments, but it will be understood that variations and modifications can be effected within the spirit and scope of the invention.

What is claimed is:

1. A phonograph having a turntable for receiving a record and an improved tone arm assembly comprising in combination:
   a support arm having a pivot end thereof mounted on the phonograph for pivotal movement of said arm in a horizontal plane substantially parallel to and spaced above the turntable;
   a tone arm housing;
   means for mounting said tone arm housing on said support arm for horizontal pivotal movement in unison therewith between rest and playing positions, and for vertical pivotal movement relative to said support arm by gravity to a normal position toward but spaced from the turntable;
   stop means on said support arm for stopping said tone arm housing in its normal position;
   a needle-cartridge carrying arm;
   means for mounting said needle-cartridge carrying arm on said tone arm housing for vertical pivotal movement relative thereto with said needle engaging a record on the turntable when said tone arm housing is in its normal position; and
   spring means coupled to said needle-cartridge carrying arm for providing the only force in addition to the weight of said needle-cartridge carrying arm for urging said needle into engagement with the record.

2. A phonograph according to claim 1 wherein said tone arm housing mounting means comprises a pivot on said support arm about which said tone arm housing pivots, said support arm pivot being located adjacent said end of said support arm opposite said pivot end, said support arm pivot further engaging said housing substantially at its midpoint such that said housing is slightly unbalanced and pivots to its normal position in which the end thereof furthest from said pivot end of said support arm engages said stop means.

3. A phonograph according to claim 2 wherein said stop means comprises a spring.

4. A phonograph according to claim 3 wherein said spring is cantilevered from said support arm.

5. A phonograph according to claim 1 wherein said phonograph has a cover movable to and from a closed position, cam means on said cover, and said tone arm housing has a cam follower positioned between said mounting means and said pivot end of said support arm and engageable by said cam means when said cover is closed while a record is in said playing position whereby said tone arm housing is initially pivoted in a direction away from its normal position withdrawing said needle from the record, and then while said needle is withdrawn pivoted along with said support arm in said horizontal plane to a rest position removed from the record.

6. A phonograph according to claim 1 wherein said phonograph has a cover movable to and from a closed position, said support arm and said tone arm housing are pivotally movable in unison from a rest position in which the needle is clear of the record to a playing position on the record, cam means are provided on said cover and a cam follower is provided on said tone arm housing between said mounting means and said pivot end of said support arm, said cam means engaging said cam follower when said cover is closed for initially pivoting said tone arm housing in a direction away from its normal position withdrawing said needle from the record, and then while said needle is withdrawn pivoting said tone arm housing and said support arm in said horizontal plane to said rest position.

7. A phonograph according to claim 1 wherein said needle-cartridge carrying arm is pivotal about one end thereof substantially at the end of said tone arm housing furthest from said pivot end of said support arm.

8. A phonograph according to claim 7 wherein said needle-cartridge is mounted on the opposite end of said carrying arm.

9. A phonograph according to claim 7 wherein said one end of said carrying arm has a radially extending leg, and said spring means comprises a helical spring having one end connected to said leg and its opposite end connected to said tone arm housing for urging said needle into engagement with the record with a force of substantially 6 grams.

10. A phonograph according to claim 1 wherein said support arm is rigid and mounted at said pivot end about a vertical axis and has a free end and resilient stop means at each end thereof for resisting and limiting pivotal movement of said support arm in each direction, said tone arm housing comprises an elongated box-like member enclosing a major portion of said support arm and pivotally mounted on a pivot adjacent said free end of said support arm, said pivot engaging said housing substantially at its midpoint so that said housing is slightly unbalanced and pivots to its normal position in which the end of said housing furthest from said vertical axis dips downwardly toward the record until a portion of said housing engages said stop means, and said needle-cartridge carrying arm is pivotal about one end thereof substantially at said end of said housing furthest from said vertical axis, and said needle-cartridge is mounted on the opposite end of said carrying arm.

* * * * *